Patented May 21, 1929.

1,713,879

UNITED STATES PATENT OFFICE.

SAMUEL G. McANALLY, OF LUDWIG, NEVADA.

PROCESS OF AGING CALCINED GYPSUM.

No Drawing.   Application filed October 4, 1926. Serial No. 139,562.

The invention relates to a process of aging calcined gypsum products, and has for its object to render the process more expeditious and cheaper.

Heretofore the aging has been done by a process in which certain deliquescent chemicals are added to the gypsum either during or after calcination. These chemicals absorb moisture from the atmosphere and this moisture is re-absorbed by the calcined gypsum. The absorption and re-absorption continue until the calcined gypsum is aged.

Another process, which has been attempted with very indifferent results and at considerable cost, is to aerate the calcined gypsum by bringing the material into contact with a large volume of air containing moisture. This is accomplished by the use of blowers, elevators, conveyors, etc.

Instead of depending on the agency of chemicals or the atmosphere to age the calcined gypsum, I employ water and/or steam. By these means I am able to completely age calcined gypsum within a few minutes time.

In practicing my invention, I mix the calcined gypsum with water or with steam, or with water and steam. The quantity of water, in either form, necessary to completely age the calcined gypsum, will depend on the temperature to which the gypsum product was calcined. The higher the degree of calcination, the less is the amount of combined water remaining in the calcined gypsum, and therefore, more will have to be added in order to completely age it. But I have found that aged "first settle" or "single boil" calcined gypsum, (calcined to between 320 degrees Fahrenheit and 360 degrees Fahrenheit) is equal, if not superior, to aged "second settle" or "double boil" calcined gypsum, (calcined to between 370 and 420 degrees Fahrenheit). The cost of manufacturing the former is considerably less than that of the latter. My process is applicable to both "single boil" and "double boil" calcined gypsum and to products thereof. I prefer to use the "single boil" product, for the reason stated above, and because the quantity of water, in either form, to be added in order to completely age it is practically a constant.

In a typical embodiment of the present invention, I take "single boil" calcined gypsum, (commonly known as plaster of Paris and gypsum stucco) and put one ton into a plaster mixing machine so as to agitate the material. Through one or more holes, drilled in the sides of the mixing machine shell, and located about six inches from the top of the shell, I inject the steam and/or the water, in the form of a fine spray, into the calcined gypsum product and at the rate of from twelve to fifteen pounds of water per minute for a period of from five to six minutes. I find that seventy pounds of water, or its equivalent in steam, can advantageously be added to one ton of newly calcined (hot) "single boil" gypsum. "Double boil" will require about 100 pounds. As soon as the desired quantity of water and/or steam has been added to the calcined gypsum in the manner described, the process is completed. The calcined gypsum is aged and possesses qualities that are entirely different from, and much superior to, those of un-aged "single boil" and "double boil" gypsum products.

My process may be performed in any type of machine which will thoroughly mix the materials. The water and/or steam may be added at any desired rate per minute. If the total quantity that is added is less than the quantity necessary to completely age the calcined gypsum, the product will be only partially aged, but it will be superior to the original product.

I may also add water through the medium of materials which absorb water mechanically. For example, I may wet or dampen a cloth or diatomaceous earth and mix these with calcined gypsum. The gypsum will then absorb the water from the mentioned class of materials.

So that the process of aging calcined gypsum products may be fully appreciated, it may be stated that fresh calcined gypsum is unsuitable for the manufacture of casting, molding and finishing plasters. Aging is essentially the absorption of water by the dry calcined gypsum which possesses the property of being able to absorb a certain amount of water and still retain its dry powdered condition. Aging causes a change in the physical properties so that, whereas 100 parts of the fresh products require, on an average, 100 parts of water to form a wet slurry, 100 parts of the aged product require, on an average, only 60 parts of water to form a slurry of equal consistency. It is evident that both products being equal in other respects, the one which requires the less water for mixing will be the stronger.

Aged calcined gypsum, when mixed with sufficient water to form a paste or a slurry, sets and hardens quicker than fresh calcined gypsum. The latter softens, ("goes back") after it sets, and, in addition, shows a considerable rise in temperature shortly after it attains its initial set. This temperature rise is very objectional when the product is used for the manufacture of castings and moldings in conjunction with glue molds; the heat destroys the molds.

Aged calcined gypsum does not have these defects. It is especially adapted for the manufacture of casting, molding and finishing plasters, and other calcined gypsum products in which quick-hardening and strength are essential qualities.

I claim:—

1. The process of aging calcined gypsum, which comprises the direct application of moisture to a body of pulverized calcined gypsum in quantities insufficient to destroy its pulverized condition, while agitating the calcined gypsum.

2. The process of aging calcined gypsum, which comprises the direct application of moisture to a body of pulverized calcined gypsum in quantities approximately seventy (70) pounds of water to a ton of calcined gypsum, while agitating the calcined gypsum.

3. The process of aging calcined gypsum, which comprises the direct application of moisture to a body of pulverized calcined gypsum at the rate of from twelve (12) to fifteen (15) pounds of water per ton of calcined gypsum per minute, and for a period of from five (5) to six (6) minutes, while agitating the calcined gypsum.

SAMUEL G. McANALLY.